(12) United States Patent
Flores et al.

(10) Patent No.: US 12,083,946 B1
(45) Date of Patent: Sep. 10, 2024

(54) STRAP FAIRING

(71) Applicants: Ross W. Flores, Richmond, TX (US); Rodney H. Masters, Cypress, TX (US)

(72) Inventors: Ross W. Flores, Richmond, TX (US); Rodney H. Masters, Cypress, TX (US)

(*) Notice: Subject to any disclaimer, the term of this patent is extended or adjusted under 35 U.S.C. 154(b) by 0 days.

(21) Appl. No.: 18/619,657

(22) Filed: Mar. 28, 2024

Related U.S. Application Data

(60) Provisional application No. 63/462,594, filed on Apr. 28, 2023.

(51) Int. Cl.
*B60P 7/08* (2006.01)

(52) U.S. Cl.
CPC ........... *B60P 7/0807* (2013.01); *B60P 7/0823* (2013.01); *B60P 7/0869* (2013.01)

(58) Field of Classification Search
CPC ..... B60P 7/0807; B60P 7/0869; B60P 7/0823; B60P 3/079; B63B 21/66; B63B 21/663
USPC ... 410/10–12, 23, 41, 50, 96–100, 116, 155; 405/211, 216
See application file for complete search history.

(56) References Cited

U.S. PATENT DOCUMENTS

| | | | | |
|---|---|---|---|---|
| 4,829,929 A | * | 5/1989 | Kerfoot | B63B 21/663 174/42 |
| 6,048,145 A | * | 4/2000 | Pedersen | B60P 7/16 410/97 |
| 7,258,516 B1 | * | 8/2007 | Collins | B60P 7/0823 410/99 |
| 2008/0069657 A1 | * | 3/2008 | George | B60P 7/0869 410/96 |
| 2016/0297348 A1 | * | 10/2016 | Chadwell, IV | B60P 7/0869 |

* cited by examiner

*Primary Examiner* — Stephen T Gordon
(74) *Attorney, Agent, or Firm* — Keeling Law, LLC; Kenneth A. Keeling; Mark S. Solomon

(57) ABSTRACT

Embodiments of a fairing of the present invention generally include a pair of fins that intersect at a first closed end thereof forming a V-shaped/pointed frontal geometry and are connectable at a second end thereof via a fin connection assembly, wherein the fairing is adapted and configured to be engaged about at least a portion of a tie-down strap that is securing a cargo object to a cargo support structure, wherein the first closed end is directionally oriented such that air flow resulting from transportation of the cargo object impinges thereupon, and wherein the first closed end geometry is adapted and configured to shield the tie-down strap from excessive vibration during transportation of the cargo object. Embodiments of a method of using embodiments of fairings of the present invention are also provided.

2 Claims, 3 Drawing Sheets

STRAP FAIRING

CROSS-REFERENCE TO RELATED APPLICATIONS

This application claims the benefit of U.S. Provisional Application No. 63/462,594 filed on Apr. 28, 2023, which application is incorporated herein by reference as if reproduced in full below.

STATEMENT REGARDING FEDERALLY SPONSORED RESEARCH OR DEVELOPMENT

Not Applicable.

FIELD OF THE INVENTION

The present invention generally relates to a device for reducing fraying and/or failure of straps utilized to secure cargo being transported openly in a land vehicle.

BACKGROUND OF THE INVENTION

When cargo is transported openly in a vehicle, it is often secured to the vehicle in some manner to prevent undesired movement, or worst of all, displacement of the cargo from the vehicle. One means of so securing cargo is to utilize one or more straps (sometimes called strops or strapping) to secure the cargo to the vehicle. Such straps typically comprise an elongated flap or ribbon of a flexible material. While these flaps may be constructed from a variety of materials, most typically the comprise woven or corded synthetic materials such as polyester, nylon or polypropylene, but may comprise leather, natural fiber rope or the like.

We have all driven down a highway passing a flatbed truck and heard the humming noise of the load tie-down straps vibrating in the wind. While the noise is what gets our attention, what matters to those transporting the cargo is the degradation of the straps due to the effects of the impingement of air on the straps. Not only does such degradation reduce the useful life of the straps and potentially cause the cargo to shift or fall from the vehicle, but many governmental transportation departments impose fines for transporting cargo using frayed tie-down straps.

It is widely known that the problem of degradation of elongated securement or connection members by vortex-induced vibration caused by fluid flow can be addressed by utilizing fairings. In one aspect, such a fairing comprises a structure attached about the elongated object to streamline the flow of fluid around the object. In marine environments the degrading fluid is water. Exemplary uses of fairings in marine environments may be found in U.S. Pat. Nos. RE48,123 to Masters et al., U.S. Pat. No. 8,834,070 to Masters et al., U.S. Pat. No. 8,579,546 to Masters et al., U.S. Pat. No. 7,934,888 to Masters et al., U.S. Pat. No. 7,674,074 to Masters et al., U.S. Pat. No. 7,337,742 to Masters et al. and U.S. Pat. No. 6,401,646 to Masters et al., each of which is incorporated herein by reference in its entirety.

While such technology is widely applicable in marine environments, extension of fairing technology to other situations wherein vortex-induced vibration of an elongated member is problematic is lacking. Accordingly, it would be desirable to utilize similar methodology to protect straps used to secure cargo in open vehicles.

BRIEF SUMMARY OF THE INVENTION

Embodiments of an apparatus of the present invention generally include a fairing designed to engage with an elongated object, such as a tie-down strap, wherein the fairing is adapted and configured to be removably positionable about the strap such that wind force on the strap resulting from forward movement of the vehicle encounters the fairing, whereby the flow of air is streamlined around the strap. In one aspect, certain embodiments of such fairings comprise a substantially V-shaped frontal geometry, wherein the fairing is positioned about the strap such that air flow impinges the fairing at the pointed end thereof. Not to be bound by theory, it is intuited that the V-shaped design provides for fluid (air) particle separation in a smooth transition in front of the strap, thereby reducing drag and minimizing vortex-induced vibration of the strap.

Embodiments of a method of using embodiments of an apparatus of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

Figure 1:
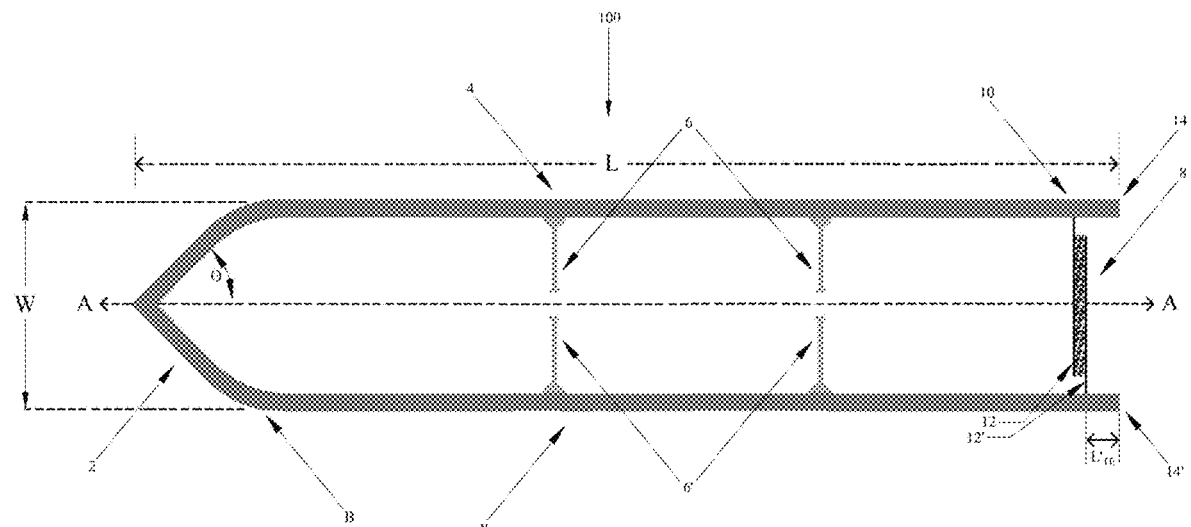
FIG. 1 is a section view depiction of an embodiment of a fairing of the present invention.

The exemplary embodiments are best understood by referring to the drawings, like numerals being used for like and corresponding parts of the various drawings. In the following description of embodiments, orientation indicators such as "top," "bottom," "up,' "down," "upper," "lower," "front," "back," etc. are used for illustration purposes only; the invention, however, is not so limited, and other possible orientations are contemplated.

Referring first to FIG. 1, a section view of an embodiment of a fairing 100 of the current invention is depicted. Importantly, while herein fairing 100 is sometimes referred to as a truck strap fairing, the invention is not so limited and embodiments of a fairing 100 may be employed with other elongated objects, such as, but not limited to, tie-down articles, such as ropes, cables, and the like, whether or not the tie-down articles are employed on a truck or other mode of conveyance, such as, but not limited to, a boat/ship, air vehicle (e.g., airplane, helicopter, etc.), trailer, snowmobile or jet ski, as would be understood by ones skilled in the art. In one embodiment, fairing 100 comprises a closed, pointed frontal end 2. In certain embodiments, closed end 2 comprises a V-shaped geometry, as depicted in FIG. 1; however, the invention is not so limited and other closed end 2 geometries may be employed. In one embodiment, a fairing 100 comprises two fins 4, 4' that intersect at closed end 2. In various embodiments, fins 4 and 4' may comprise separate components that are attached at closed end 2, or a fairing 100 may comprise fins 4 and 4' that are integrally associated, i.e., fins 4 and 4' forming a closed end 2 may comprise an integrated unit. In one embodiment, the angling of fin 4 and fin 4' may comprise angles θ and θ', respectively of about 45° with respect to a longitudinal axis A of fairing 100, although the invention is not so limited and other angles θ and θ' may be employed. In one aspect, angles θ and θ' may be equal, however although the invention is not so limited and unequal angles θ and θ' may be employed.

Still referring to FIG. 1, in one embodiment, a fairing 100 may comprise one or more stability members 6, 6'. In one aspect, a stability member 6 or 6' may be attached at one end thereof to fins 4 or 4', respectively, as shown in FIG. 1. In one embodiment, a stability member 6, 6' may be attached to, reversibly or irreversibly, or integral with, one of fins 4 or 4'. Such attachment may comprise any useful means, such as, but not limited to, nut and bolt, hook and eyelet, or the like, as would be understood by one skilled in the art. In such embodiments, a stability member 6 attached to or integral with a fin 4, for example, may be positioned substantially directly opposite another stability member 6' similarly attached to or integral with the opposing fin 4'. Although the stability members 6, 6' shown in FIG. 1 are depicted a being substantially linear, the invention is not so limited and other stability member 6, 6' geometries may be employed.

Also shown in FIG. 1 is an embodiment of a fin connection assembly 8. In one embodiment, a fairing 100 may comprise a fin connection assembly 8 that functions to provide a closed second end 10 of fairing 100. In one embodiment, such a fin connection assembly 8 may comprise attachable Velcro® (i.e., hook and loop) fasteners 12, 12', although the invention is not so limited and other reversible mechanisms for connecting fin 4 to fin 4' may be employed. In various embodiments (not shown), connections mechanisms such as, but not limited to, bolts, cotter pins, self-tapping screws, and the like, may be employed for connecting fin 4 to fin 4', as would be understood by one skilled in the art. In other embodiments (not shown), a fairing 100 may comprise a fin connection assembly 8 wherein one or more components may be irreversibly or integrally attached to both fin 4 and fin 4'. In one aspect, a fin connection assembly 8 may function to maintain a desired distance between fins 4 and 4'.

Still referring to FIG. 1, a fairing 100 may comprise a closed end width "W" of about 1.5" to about 2", although the invention is not so limited and width W of a fairing 100 may be less than about 1.5" or greater than about 2". In one aspect, the fins 4 and 4' depicted in the embodiment shown in FIG. 1 are substantially linear extending from bend points "B" and B'", respectively, although the invention is not so limited and one or both of fins 4 and 4' may comprise a non-linear geometry. In addition, although the substantially linear fins 4 and 4' depicted in the embodiment of FIG. 1 are substantially parallel to (i.e., "mirror") each other, the invention is not so limited and a fairing 100 comprising substantially linear fins 4 and 4' may have such fins oriented in a non-parallel arrangement.

With further regard to various embodiments of a fairing 100, materials of construction for fins 4 and 4' include, but are not limited to, extruded plastics, fiberglass, metal, wood and the like, although fins 4 and 4' may comprise any suitable material(s). In one embodiment fins 4 and 4' comprise the same material(s) of construction, although the invention is not so limited and fins 4 and 4' may comprise different materials of construction. In one aspect, embodiments of a fairing 100 may comprise of any suitable overall length "L", as is discussed in greater detail below with regard to FIG. 2. Further, fins 4 and 4' may comprise any suitable width (not separately labeled). In addition, fin 4 and/or fin 4' may or may not comprise substantially the same width throughout the length thereof, and fins 4 and 4' may or may not comprise the same widths.

Again referring to FIG. 1, a fin 4 and/or fin 4' may comprise a tail end length "LTE" (not separately labeled) or "$L'_{TE}$", respectively, that is defined as the distance between where the fin connection assembly 8 extends from fin 4 or fin 4' to a terminal fin end 14 or 14', respectively. In the embodiment of fairing 100 shown in FIG. 1, terminal fin ends 14 and 14' are substantially equal in length, although the invention is not so limited and terminal fin ends 14 and 14' may comprise different lengths LTE and L'TE. In one aspect, while terminal fin ends 14 and 14' are depicted as comprising a substantially linear geometry in FIG. 1, the invention is not so limited and terminal fin ends 14 and/or 14' may comprise a non-linear geometry.

Figure 2:
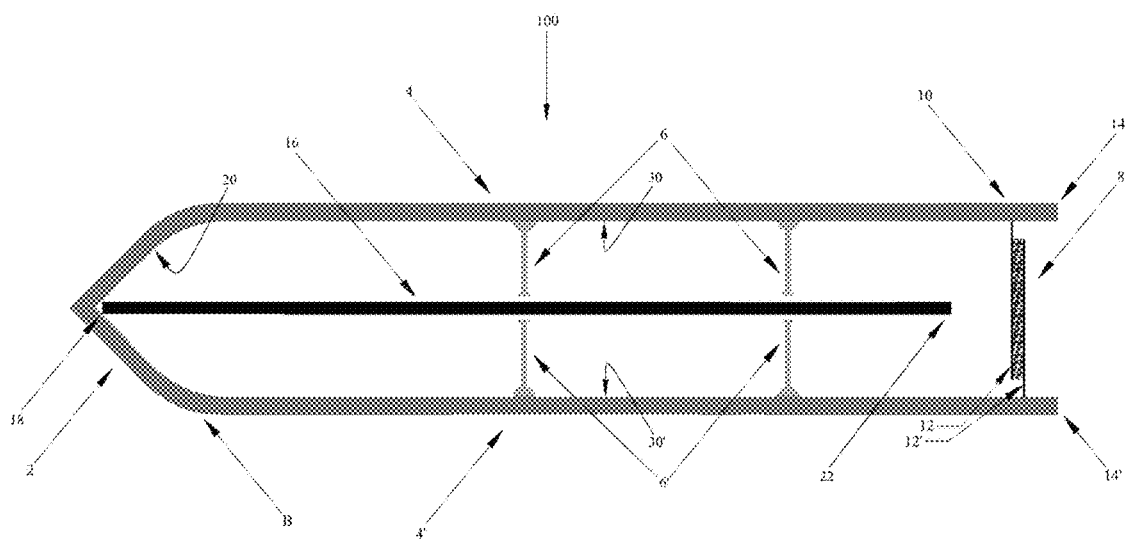
FIG. 2 is a section view depiction of an embodiment of a fairing of the present invention positioned about a strap.

Referring now to FIG. 2, a section view of an embodiment of a fairing 100 deployed about a portion of a strap 16 is depicted. In this embodiment, the fairing 100 is disposed about the strap 16 wherein the strap 16 is centrally positioned between fins 4 and 4'. In other embodiments (not shown), the strap 16 may be otherwise positioned within a fairing 100. In certain embodiments (not shown) the fins 4 and 4' of a fairing 100 may be spaced such that at least a portion of a strap 16 positioned therebetween may contact an internal face 30, 30', of one or both of fins 4, 4', respectively. In one embodiment, an upwind edge 18 the strap 16 abuts the internal wall 20 of the first closed end 2 of the fairing 100 at or proximate the intersection of fins 4 and 4', however, the invention is not so limited and upwind edge 18 may be otherwise positioned with respect to internal wall 20.

Still referring to FIG. 2, as would be understood by one skilled in the art, optional stability member(s) 6 and/or 6' may be disposed along fins 4 and/or 4', respectively. In one such embodiment (not shown), a stability member 6 may abut strap 16 along the length thereof.

Figure 3:
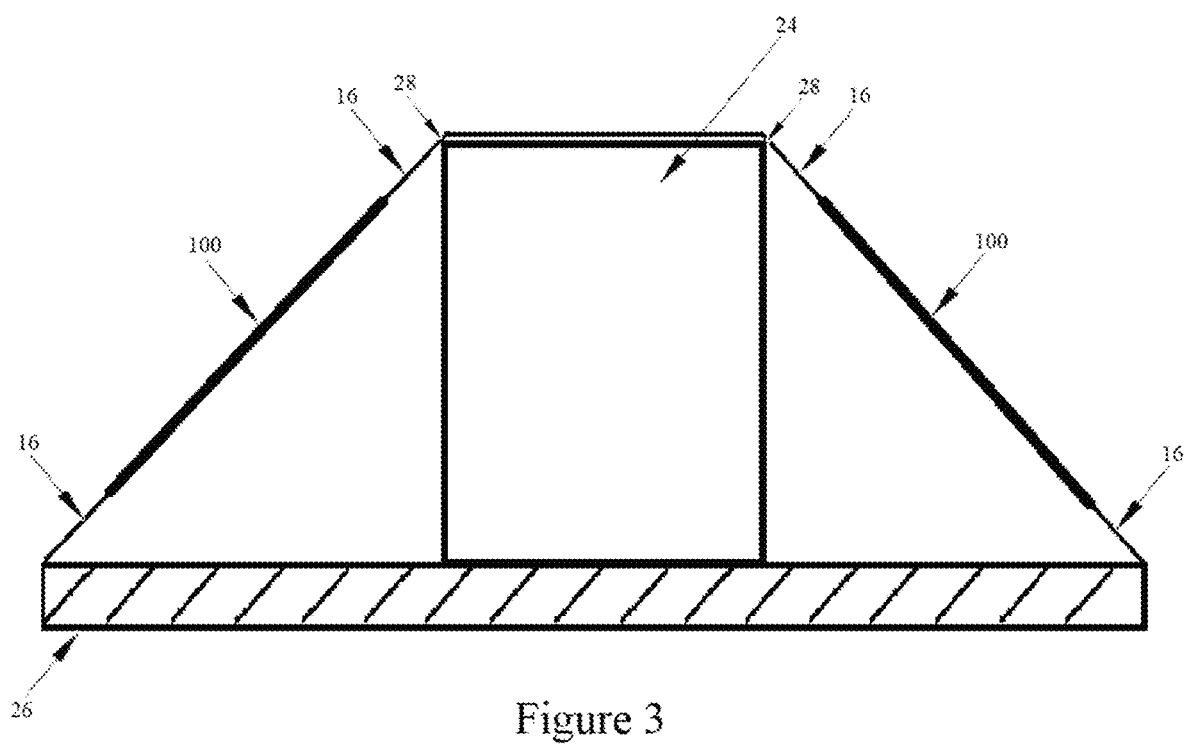
FIG. 3 is a depiction of an embodiment of fairings of the present invention positioned about straps that are securing a cargo object to a cargo support structure.

Now referring to FIG. 3, end-on view of a cargo object 24 secured by a strap 16 to a cargo support structure 26 is depicted. In the embodiment shown in FIG. 3, two fairings 100 are positioned about a portion of the strap 16 on either side of the cargo object 24. Although herein the cargo support structure 24 may be referred to herein as the working surface of a flatbed truck, or an object disposed thereupon (e.g., a pallet), the invention is not so limited and embodiments of fairings 100 of the present invention may be employed on (or proximate) other cargo transport surfaces that are exposed to wind movement, such as, but not limited to, trains, boats and conveyor systems.

Figure 4:
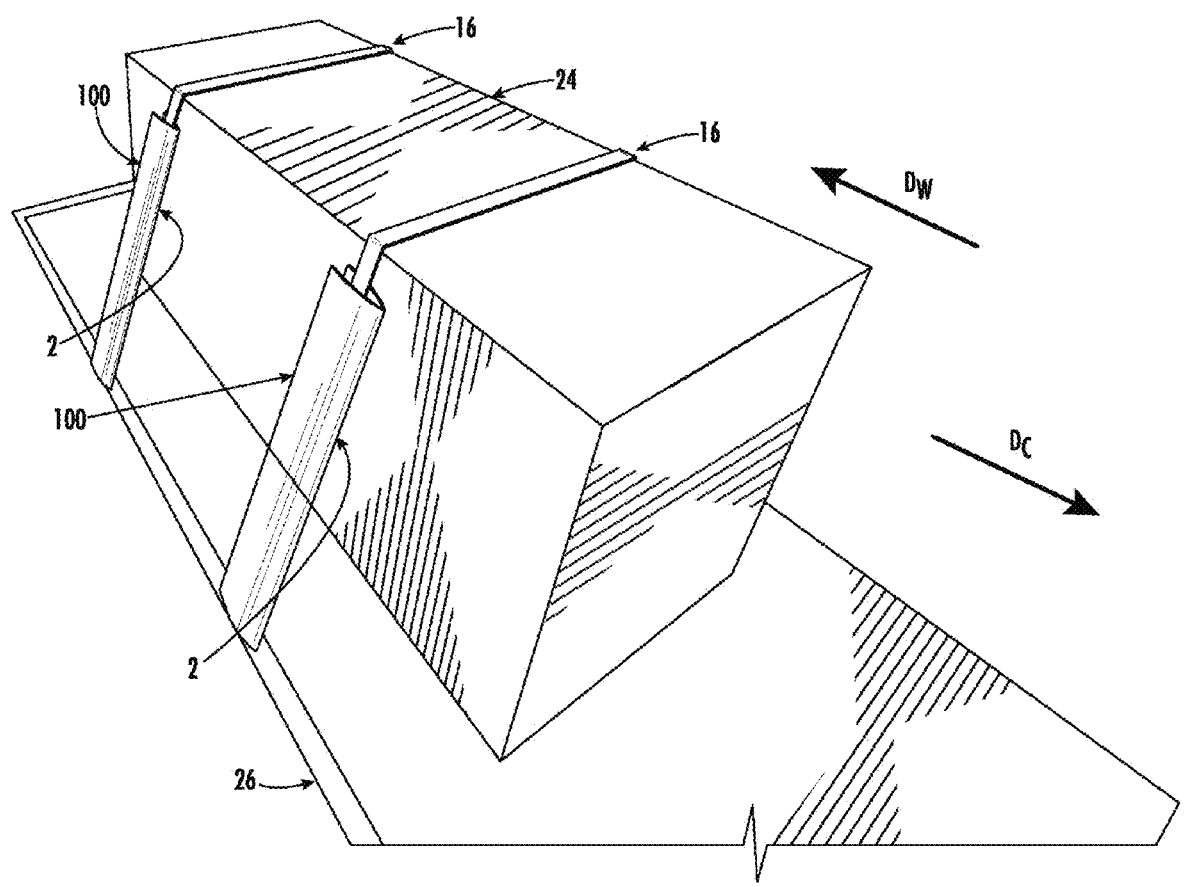
FIG. 4 is a depiction of a cargo object secured with straps equipped with an embodiment of a fairing of the present invention showing wind movement in relation to the cargo object.

Depicted in FIG. 4 is a perspective view of an embodiment of fairings 100 of the present invention employed to protect straps 16 securing a cargo object 24. While in FIG. 4 the fairings 100 are depicted as extending substantially completely along the length of the straps 16 from the cargo support structure 26 to the edge 28 of cargo object 24, the invention is not so limited and a fairing 100 may be sized such that it extends along any portion of the length of the strap 16 between the cargo support structure 26 and the edge 28 of cargo object 24. In other embodiments (not shown), a plurality of fairings 100 may be employed along a strap 16 between the cargo support structure 26 and the edge 28 of cargo object 24. In such embodiments, adjacent fairings 100 may abut each other, or may be spaced apart. As would be understood by one skilled in the art, fairings 100 may be similarly employed on the side of the cargo object 24 not visible in FIG. 4.

In the embodiment shown in FIG. 4, the direction of movement of the cargo object 24 (e.g., the direction of movement of a flatbed truck (not shown) on which the cargo object 24 is disposed) is depicted by the arrow labeled $D_c$, and the relative direction of the air flow engaging the fairings 100 is depicted by the arrow labeled $D_w$. In various embodiments, the fairings 100 are oriented such that the air flow resulting from movement of the truck (indicated by $D_w$) engages first closed ends 2 of the fairings 100. Not to be bound by theory, it is intuited that impingement of the wind on the V-shaped (i.e., pointed frontal) edge thereof results in less strap vibration that experienced when the straps are not protected by the fairings 100, thereby reducing the drag coefficient and vibration-induced degradation of the straps 16.

Operation

Generally, an embodiment of employing a fairing 100 comprises engagement thereof with a strap 16 (or other tie-down article). In certain embodiments, a strap comprises a 4", 6" or 8" width, although the invention is not so limited and embodiments of a fairing 100 may be employed with straps comprising other widths. In one embodiment, a cargo object 24 that has been secured on a cargo support structure 26 of a flatbed truck with one or more straps 16 is fitted with at least one fairing 100 on at least one strap 16, such that the fairings 100 are oriented such that the relative air flow resulting from movement of the truck (indicated by $D_w$ in FIG. 4) engages first closed ends 2 of the fairings 100. In one such embodiment, a fairing 100, having a fin connection assembly 8 in an open (unconnected) arrangement, is positioned about the strap 16 such that some length of the strap 16 is maintained within the fairing 100 between fins 4 and 4'. Thereafter, the fin connection assembly 8 is manipulated into a closed (connected) arrangement such that the fairing 100 comprises a second closed end 10. Optionally, one or more stability members of the fairing 100 may be engaged such that fins 4 and 4' are more securely connected.

In other embodiments, employment of a fairing 100 may be accomplished by feeding a portion of a strap 16 through one or more fairings 100 that have previously been arranged in a closed orientation, i.e., where the fin connection assembly 8 has already been manipulated into a closed (connected) arrangement such that the fairing 100 comprises a second closed end 10. In such embodiments, once the strap 16 is equipped with one or more fairings 16, it would be manipulated to secure the cargo object 24 on a cargo support structure 26, as would be understood by one skilled in the art.

Method

An exemplary method of utilizing an embodiment of a fairing of the present invention comprises:

A Cargo Object Securement Step, comprising providing a cargo object, such as cargo object 24, on a cargo support structure, such as cargo support structure 26, with a connection article, such as strap 16; and A Fairing Equipment Step, comprising providing a fairing, such as fairing 100, about a portion of the strap, whereby a first closed end of the fairing, such as first closed end 2, is oriented such that upon movement cargo object, such as via movement of a truck on which the cargo object is openly disposed, relative air flow is directed toward the closed end of the fairing.

The foregoing method is merely exemplary, and additional embodiments of methods of providing protection of a connection article by a fairing of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

We claim:

1. A fairing system comprising:
   a fairing comprising two fins intersecting in a closed-end frontal geometry; and
   an elongated object;
   wherein:
      said fairing at least partially encompasses at least a portion of said elongated object;
      said elongated object comprises at least a portion of a tie-down article being utilized to secure one or more cargo objects that is being, or is to be, transported;
      said fins extend beyond a transverse dimension of said elongated object;
      said fins are reversibly connectable beyond said transverse dimension of said elongated object;
      said reversible connectivity comprises a connection assembly; and
      said connection assembly comprises a hook and loop fastener.

2. A method of using a fairing comprising two fins intersecting in a closed-end frontal geometry;
   wherein:
      said fairing is employable with an elongated object to at least partially encompass at least a portion thereof;
      said elongated object comprises at least a portion of a tie-down article being utilized to secure one or more cargo objects being transported,
      said fins extend beyond a transverse dimension of said elongated object and said fins are reversibly connectable beyond said transverse dimension of said elongated object;
      said reversible connectivity comprises a connection assembly; and
      said connection assembly comprises a hook and loop fastener;
   said method comprising:
      positioning said fairing such that it at least partially encompasses at least a portion of said elongated object; and
      transporting said one or more cargo objects;
   wherein:
      said one or more cargo objects are at least partially secured by said elongated object; and
      while transporting said one or more cargo objects, said fairing-equipped elongated object is exposed to relative air flow such that said air flow is directed toward said closed-end frontal geometry.

* * * * *